Figure 1:
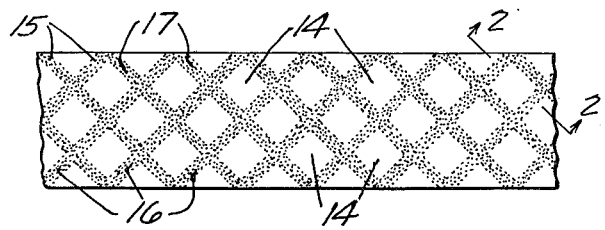

Dec. 26, 1961 P. V. PALMQUIST 3,014,409
SPECULAR-APPEARING REFLEX REFLECTORS
Filed April 9, 1958

INVENTOR
PHILIP V. PALMQUIST
BY
Carpenter, Abbott, Coulter & Kinney
ATTORNEYS

United States Patent Office 3,014,409
Patented Dec. 26, 1961

3,014,409
SPECULAR-APPEARING REFLEX REFLECTORS
Philip V. Palmquist, Maplewood, Minn., assignor to Minnesota Mining and Manufacturing Company, St. Paul, Minn., a corporation of Delaware
Filed Apr. 9, 1958, Ser. No. 727,414
5 Claims. (Cl. 88—82)

This invention relates to a sheet material wherein specular reflection of light predominates by day and reflex reflection of light predominates at night.

The sheet material hereof is particularly useful for affixation to chromium-plated automobile bumpers so as to provide the safety features of reflex reflection, without at the same time rendering the automobile bumpers unsightly. It is also useful in a multitude of other applications, particularly those where the specular-reflecting beauty or other characteristics of a surface are to be essentially preserved, and yet brilliant reflex-reflection of light is desired.

Colored reflex-reflecting strips of the prior art have been affixed to automobile bumpers and have effectively served as warning markers under nighttime lighting conditions; however, wide-spread use of these prior art colored reflex-reflecting strips on automobile bumpers by the general public has suffered, apparently because of the belief that they tend to spoil the otherwise beautiful day-time appearance of a brilliant chrome bumper. Yet for safety reasons, wide-spread application of reflex-reflective sheeting to automobile bumpers is desired.

Merely selecting reflex-reflecting sheeting of desired beauty characteristics and affixing such a sheeting to a bumper, however, is not alone the solution to this problem. According to work done by investigators in the field of highway safety, as presented to the Night Visibility Committee of the Highway Research Board, Washington, D.C., January 8, 1957, on the subject "Visibility of Reflectorized License Plates," it is necessary that a reflex-reflector exhibit a certain minimum light return if it is to perform the desired warning and alerting function to drivers of automobiles. For a reflector having an area of approximately 36 square inches, this minimum light return is about 5 candle power per foot candle of incident light on the reflector, the light return being measured at an angle of ⅓° divergence from the incident beam using the SAE method of measuring reflectors. The study on which such a conclusion is based took into account, among other things, the visibility distance required to warn a driver traveling at present day highway speeds so as to give the driver time to react and time to slow down to avoid an accident. The reflective performance was considered essential under conditions where the incident light might strike the surface at an oblique angle (up to about 45° from normal) as well as where the incident light might strike the structure at an angle near normal to its surface. In view of this high reflex-reflection requirement, it can readily be appreciated that the mere use of a reflex-reflector of pleasing appearance is unsatisfactory, unless the reflex-reflector also possesses the required light returning power. Few types of reflex-reflectors of the prior art satisfy such a rigid light return requirement; and of those that do, pleasing appearance on a chrome bumper, as far as the general public is concerned, seems to be a noticeably lacking characteristic.

A long time ago it was realized that a need existed for a sheeting of desired pleasing specular-reflecting appearance which also would serve as a brilliant reflex-reflector under nighttime lighting conditions. In fact, it was appreciated that such a sheeting should actually appear unobtrusive on a chrome-plated surface during daytime, and yet serve as a brilliant reflex-reflector at night. To make such a sheeting, however, appeared impossible, for the reason that mirror-like specular-reflection of light, as exhibited by chrome plate, is essentially the antithesis of reflex-reflection of light, as needed in reflex-reflectors. Light impinging on a mirror-like surface leaves the surface at an angle essentially equal to the angle of incidence, but on the other side of normal. In reflex-reflection, however, light impinging on the surface is directed back in a brilliant cone having its axis essentially common with the angle of the incident beam, even though the incident beam strikes the surface at an angle other than normal. Viewed from anywhere other than near the beam of impinging light, a brilliant reflex-reflecting surface generally appears dull and uninteresting. It actually does not have a brilliant appearance. Thus to retain specular-reflection and yet gain brilliant reflex-reflection appeared impossible. Such was the status of the art at the time that I conceived of the sheeting of this invention.

My sheeting actually presents a "subtle" pleasing shiny and brilliant specular-reflecting surface when viewed under daytime lighting conditions, and it even presents such an appearance at nighttime to persons viewing it from an angle other than near the beam or rays of incident light upon it. But at night, when viewed near an incident beam of light striking the surface of my sheet article, brilliant light return according to the principles of reflex-reflection is realized; and, even more surprising, this brilliant light return is at least sufficient to satisfy the minimum reflex-reflecting requirement aforespecified. Thus, my sheeting possesses not only the essential safety features as aforedelineated, but also the required pleasing or beautiful shiny appearance so long sought after.

Figure 2:
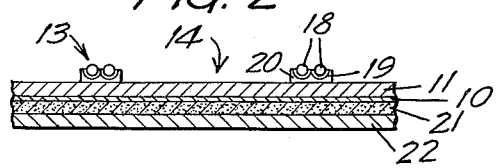
Figure 3:
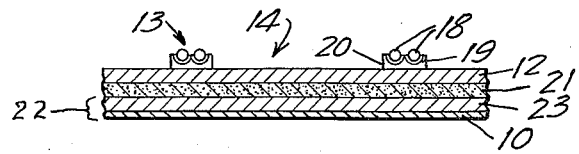

I will now describe this unusual sheeting and ways for making and using it. In connection with the description, a drawing, made a part hereof, will be referred to. In the drawing, FIGURE 1 is a schematic view of the front face of one embodiment of my sheet material; and FIGURES 2 and 3 are highly magnified or exaggerated schematic illustrations in side elevation, taken through line 2—2 of FIGURE 1, showing the sheet structure of two varied illustrative sheet-structure laminates of the invention.

To obtain the necessary shiny appearance of the front face of my sheeting, it is necessary to employ a shiny specular-reflecting layer 10 in the sheet article. This layer may be prepared by deposition of metal vapor (e.g., vapors of aluminum, gold, tin, silver, etc.) onto a smooth-surfaced, transparent film (see 11 in FIGURE 2) such as, for example, a film or layer of ethylene glycol terephthalate polyester resin, a transparent alkyd, cellulose acetate butyrate, etc. Viewed through the transparent layer, the structure presents a shiny brilliant appearance, and is characterized as being specular-reflecting. While vapor-deposited metal on a transparent film is the preferred method for attaining brilliant specular-reflection from the front face of my sheet article, it is not the sole means for such a result. Less desired, but suitable constructions, may employ a polished metal or metallic foil for this structural feature.

In addition to the layer of specular-reflecting material (whether such is a vapor-deposited film or a foil), my sheet articles have a thin, flexible, coherent, weather-resistant, transparent film or layer (e.g., an organic polymeric resinous film) as an essential structural feature. This film is illustrated as 11 in FIGURE 2 and as 12 in FIGURE 3. This film may be the ethylene glycol terephthalate polyester resin film or analogous film to which the specular-reflecting metal layer is affixed or vapor deposited (see FIGURE 2), or it may be, as in the embodiment illustrated in FIGURE 3, a separate film or layer 12 not immediately adjacent the specular-reflecting surface layer.

On this transparent layer is affixed a pattern of reflex-reflecting areas 13. It is essential that the pattern be an "open" pattern, having areas, such as those numbered 14, free of reflex-reflecting elements; and it is further essential that the total coverage of the areas of reflex-reflecting elements be not in excess of 30%, nor less than 10%, of the total front face area of the sheet article. A greater area of coverage results in a loss of the apparent specular-reflecting quality of the face of the sheet article, and less area of coverage causes a drop in reflective power to a value below that which is required for safety using a conventional amount of the sheet article, e.g., 36 square inches. For the desired mirror-like appearance of my sheeting, a pattern of cross-hatched lines or narrow bands 15 (see FIGURE 1) of reflex-reflecting elements on this transparent film has been found to be substantially more effective than a pattern of dots or the like. Surprisingly, even with equal area coverage and equivalent "open" space, a sheet material having a pattern of cross-hatched lines of reflex-reflective elements gives a much more pronounced appearance of being essentially mirror-like and specular-reflecting than a sheet material having a pattern of dots of reflex-reflecting elements. The latter, to some observers, tends toward being matt-like in appearance.

A cross-hatched pattern for my sheeting should preferably be formed with its narrow bands of reflex-reflecting elements separated by a distance at least about 5 times greater than the width of the bands themselves. The bands should be no wider than about $\frac{1}{16}$ inch. Preferably, as illustrated in FIGURE 1, a series of essentially parallel bands 16 are crossed by a further series of essentially parallel bands 17 to form the cross-hatched pattern. Thus diamond or rectangular or square areas of specular-reflection on the front face of the sheet material are preferred. If desired, however, narrow bands of reflex-reflecting elements may be so directed across the front face of the sheet material as to form triangular, pentagonal, etc., areas of specular-reflection.

In attaining the required brilliant reflex-reflection exhibited by my sheet articles, it is important that small transparent glass bead microspheres 18, serving as minute sphere-lenses, and having a refractive index ($n_D$) of approximately 1.9, be employed, and that each sphere be capped on its back extremity away from the viewer with a specularly-reflecting hemispherical film 19 or layer. Small spheres having a refractive index of between 1.7 and 2.0 may be used, but the desired maximum reflex-reflection per element is gained when the refractive index of the spheres is about 1.9. If desired, these spheres may be made up of small inner glass cores of relatively low refractive index with a thin concentric coating applied about them (as taught in Palmquist et al. Patent No. 2,407,680) so as to raise the effective refractive index of the composite spheres to a figure within the range aforespecified. The diameters of the glass bead microspheres for use in my sheet articles should be preferably be in the range of about 25 to 75 microns (1 to 3 mils).

Silver deposited in a hemispherical cap 19 on the underlying or rear portion of the spheres has been found to provide the desired reflecting cap coating or means by which light entering the small spheres is reflected back out of them in a direction substantially common with the direction of incident light. However, materials other than silver may be used for the reflecting hemispherical caps on these spheres; and aluminum is suggested as a possible metal to employ. Suitable hemispherical reflecting caps can, for example, be placed on the beads by vapor deposition techniques, or by methods such as illustrated below in the examples.

The reflex-reflecting elements are illustrated in FIGURES 2 and 3 as being anchored in a weather-resistant bead bonding resin 20 which is applied on the transparent film according to the pattern in which the reflex-reflecting elements are desired to be affixed.

In addition to the foregoing, the structures hereof have a layer of adhesive 21 and are equipped with a temporary, removable, low-adhesion protective liner 22. In the structural embodiment illustrated in FIGURE 3, this protective liner actually consists of the specular-reflecting layer 10 and a low-adhesion coating 23 thereover.

The foregoing and other structural features of my sheet material will be further elucidated in the following illustrative examples.

Example 1

A transparent 1-mil thick film of tensilized (i.e., stretched and cooled) ethylene glycol terephthalate polyester resin (sold under the trademark "Mylar") was metallized on one side with a visibily-continuous aluminum film. In this operation, aluminum vapor was deposited as a thin film on the ethylene glycol terephthalate polyester resin film in a high vacuum.

A heptane solution of methyl isoamyl acrylate (i.e., acrylic acid ester of 2-methyl pentanol-4) at a concentration of 20% solids was then coated over the aluminum side of this structure at a thickness sufficient to give, on evaporation of the heptane, a residual acrylate coating of about 8 grains dry weight per 24 sq. in. of surface. Heptane was removed by brief heating at 180° F., leaving the acrylate behind as a pressure-sensitive coating. This is but one of many varied rubber-resin type pressure-sensitive adhesives which may be employed. A removable low-adhesion protective liner consisting of a polyethylene-coated paper was then applied over the acrylate coating and pressed into intimate contact.

The exposed surface of the ethylene glycol terephthalate polyester resin film of the foregoing structure was then treated as follows: First, a resin solution in a cross-hatched pattern of lines, as illustrated in FIGURE 1, was screen processed upon it. The lines were about $\frac{1}{32}$ inch wide and those running parallel with each other were separated by a distance of about $\frac{9}{32}$ inch. The resin solution employed was a blended mixture of the following:

| | Parts by weight |
|---|---|
| Short oil soya-modified alkyd resin (sold under the trademark "Beckosol HV 1307") at about 50% solids in VM & P Naphtha | 69.3 |
| Medium to long chain dehydrated castor oil modified alkyd resin ("707 Toner") at about 75% solids in VM & P Naphtha and 2 ethyl hexanol | 24.7 |
| Butlylated melamine-formaldehyde resin (sold under the trademark "Cymel 248-8 (Melmac)") at about 55% solids in xylene and butanol | 4.9 |
| A combination of driers consisting of 6.75 parts cobalt naphthenate drier (6% cobalt), 18 parts of manganese naphthenate drier (6% manganese), and 34.25 parts lead napthenate drier (16% lead), all dissolved in about 41 parts of mineral spirits solvent | 1.0 |
| Odorless alkylated-type petroleum thinner (sold under the trademark "Shell SOL-72 Code 8172" solvent | 50.0 |

Solvent from the screen processed resin pattern was substantially removed by forced air drying for 5 minutes at 150° F., leaving behind a tacky resin pattern having a thickness of about 20 microns.

Then silvered beads of 1.9 refractive index and an average diameter of about 30 to 55 microns were flooded onto the tacky pattern of screen processed resin. The beads had been previously silvered by a process as follows: About 300 parts by weight of the glass beads were added to about 1200 parts of de-ionized water containing about 12 parts of silver nitrate, the mixing being done in a stainless steel mixing vessel. To this was added about 25 parts of a 28% solution of ammonium hydroxide while stirring the mixture and keeping the beads agitated. Then about 10 parts of dextrose and 32 parts of de-ionized water were stirred in the mixture, followed immediately by stirring in a solution of 6 parts of potassium hydroxide in 32 parts of water. Reaction was allowed to proceed for up to about 5 minutes so as to obtain a chemical deposition of silver on the surfaces of the beads. During this reaction, the beads were constantly agitated in the mixture. After reaction, the water and components dissolved therein were removed from the coated beads. Then the coated beads were washed with tap water and dried at about 300° F. with mild agitation for about 5 minutes.

The complete structure aforenoted, with silvered beads flooded on its surface, was then passed through the nip of two coacting rubber rolls so as to firmly press and anchor the silvered beads a short distance into the coating of the tacky resin. Then excess loose beads were brushed off the sheet and the beaded pattern on the sheet was subjected to a bath of about 10 seconds duration in a solution consisting of 2.7 parts by weight of sulfuric acid, 0.8 part potassium dichromate and 96.5 parts of water. This particular treatment served to remove the silver coating from portions of the beads not embedded in the resin binder layer. After about 10 seconds in the bath, the sheet structure was rinsed with water and dried by warm air. The resin bond for the beads was then cured by heating the structure to 120° F. for 15 minutes, followed by 150° F. for 15 minutes, and then 180° F. for about 10 minutes until thoroughly cured.

The resulting product is a laminate having a front face which appears silvery and specular-reflecting by day and yet provides for brilliant reflex-reflection at night. For 36 square inches of area of this sheet material, a reflex-reflection light return, measured as aforespecified, of 11 candle power per foot candle of incident light normal to the surface has been observed. Even at angles other than normal to the surface of such an area of this sheet (e.g., at 45° to the normal) its reflex-reflection light return tested to at least 5 candle power per foot candle of incident light.

The laminate may be cut into strips and the strips wound in overlapping convolutions on a core for marketing. Users of the resulting sheet article merely unwind it from its core, tear off the protective liner to expose the adhesive, and affix the chrome-appearing strip to a bumper of their automobile. In place on the bumper, it is barely noticeable during daylight. If anything, the cross-hatched lines of reflex-reflective elements add to the beauty of the chrome-appearing bumper; but at night, drivers of automobiles behind an automobile "protected" with my sheet material are alerted at substantial distances, and under usual circumstances, have time to react and stop to avoid a collision, if such is necessary.

Example 2

A structure such as illustrated in FIGURE 2 was prepared using 1-mil thick polished aluminum foil for the specular-reflecting characteristic. The unpolished back side of the foil was first laminated to a pressure-sensitive adhesive coated carrier web. The adhesive and polyethylene-coated paper of Example 1 were used to form this structure. In the final product the carrier web (i.e., the polyethylene-coated paper) served as a temporary protective removable liner for the pressure-sensitive adhesive, and was easily removed from the pressure-sensitive adhesive layer. In removing the web, the pressure-sensitive adhesive is noted to remain firmly in place on the back of the aluminum foil since it forms a stronger attachment thereto than the low-adhesion surface of the web.

A uniform continuous coating or layer of flexible transparent resin was then applied over the exposed shiny face of the aluminum foil. In this manner, the shiny surface was protected against corrosion. This protective resin layer was approximately ½ to 1 mil in thickness and was applied by coating a mixture of ingredients on the aluminum and then drying and curing the applied layer for one hour at 200° F. The mixture of ingredients consisted of 96 parts by weight of an alcohol solution of short oil linseed alkyd resin (60% solids in the alcohol), 3 parts by weight of a solution of urea formaldehyde resin (60% solids in a solvent mixture of xylene and butanol), and 1 part of a metallic drier mixture consisting of lead, cobalt and manganese naphthenates.

After drying and curing the transparent resin coating, a cross-hatched pattern of bead binder resin and silvered beads were applied thereover and processed as in Example 1.

Example 3

The structure illustrated in FIGURE 3 was formed as follows: An ethylene glycol terephthalate polyester resin film was used as the flexible transparent base upon which the pattern of bead bonding resin and reflex-reflecting elements were applied, as described in Example 1.

A polished aluminum foil was thinly coated on its polished side with a dilute solution of a low-adhesion, release-agent silicone polymer composition so as to provide, upon evaporation of solvent and heat cure of the composition, a low-adhesion surface coating of less than about 1 mil thick. The silicone composition employed was Dow Corning Corporation's "DC23" (a polysiloxane composition containing silanic hydrogen and an organic tin compound as a curing aid) dissolved in xylene at a concentration of about 5% solids by weight; and the coating was heated to 400° F. for 15 minutes to effect cure.

On the back side of the aforementioned ethylene glycol terephthalate polyester resin film was then coated a layer of the transparent pressure-sensitive adhesive described in Example 1, and the aluminum foil was placed with its low-adhesion surface against the pressure-sensitive adhesive coating to form a laminate which, on its face, exhibited the properties of reflex-reflection and specular-reflection as described for the articles hereof.

In use, the chrome-appearing temporary liner of this structure, which serves to provide "counter-appeal" to the article on the shelf, is stripped from the pressure-sensitive adhesive coated flexible transparent film, leaving a transparent sheet layer having a pattern of reflex-reflecting elements as aforedescribed thereon. When this transparent sheet with reflective elements is placed on an automobile bumper, or analogous base surface, the reflective properties of the base surface are essentially preserved, yet brilliant reflex-reflection of light is gained.

Where desired, the transparent film on which the reflex-reflecting elements are affixed may be dyed various colors to provide a transparent color layer. For example, such a film may be dyed a gold color by adding a small amount of a colloidal dispersion of hydrated iron oxides to the resin mass used in preparing the film. Where such is done in combination with, for example, an aluminum specular-reflecting layer, the color of the dyed transparent film predominates to the eyes of an observer under daylight conditions, yet reflex-reflection of a high order is still exhibited by the composite structure.

I thus have successfully prepared sheet materials which not only are specular-reflecting and attractive in appearance to observers under daylight conditions, but which additionally possess the requisite characteristic of brilliant reflex-reflection of light when viewed near the beam of incident light under nighttime conditions.

It will be apparent to those skilled in the art that modifications to the foregoing disclosure may be made without departing from the scope of my invention, as further set forth and defined in the appended claims.

That which is claimed is:

1. A reflective sheet material on the front face of which specular reflection of light predominates by normal day viewing and reflex-reflection of light is provided for night viewing, comprising (1) a flexible transparent layer, (2) a smooth-surfaced, visibly-continuous metallic film presenting a specular reflecting surface facing said transparent layer and visible through said transparent layer from the front face of said sheet material, and (3) a discontinuous pattern of reflex-reflecting areas consisting of reflex-reflecting elements firmly affixed in a binder on the front face of said transparent layer, the reflex-reflecting areas of said discontinuous pattern covering between about 10 and 30% of the total area of the front face of said sheet material, said sheet material exhibiting a reflex-reflecting return of light for every 36 square inches of area of at least 5 candle power per foot candle of incident light as measured at an angle of one-third degree from the incident beam under nighttime conditions, said reflex-reflecting elements consisting essentially of transparent glass bead microspheres having minute specularly-reflecting hemispherical caps underlying the back extremity thereof and having a refractive index of about 1.9.

2. A reflective sheet material on the front face of which specular-reflection of light predominates by normal day viewing and reflex-reflection of light is provided for night viewing, comprising a smooth-surfaced metallic layer presenting a specular reflecting surface visible by day from the front face of said sheet material, a flexible transparent layer over the front face of said metallic layer and reflex-reflecting areas consisting of reflex-reflecting elements firmly affixed in a binder and superimposed in an "open" pattern of reflex-reflecting areas over the front face of said smooth-surfaced metallic layer, at least 70% of the total area of the front face of said sheet material being specular in reflecting qualities and free of said reflex-reflecting areas, and between about 10 and 30% of the total area of the front face of said sheet material being covered by said reflex-reflecting areas.

3. A reflective sheet material on the front face of which specular reflection of light predominates by normal day viewing and reflex-reflection of light is provided for night viewing, comprising a smooth-surfaced metallic layer presenting a specular reflecting surface visible by day from the front face of said sheet material, a flexible transparent layer over the front face of said metallic layer and reflex-reflecting elements firmly affixed in a binder and superimposed in a pattern of narrow bands over the front face of said smooth-surfaced metallic layer, at least 70% of the total area of the front face of said sheet material being specular in reflecting qualities and free of said reflex-reflecting elements, and between about 10 and 30% of the total area of the front face of said sheet material being covered by said narrow bands of said reflex-reflecting elements, said bands being no greater than $\frac{1}{16}$ inch wide.

4. A reflective sheet material on the front face of which specular reflection of light predominates by normal day viewing and reflex-reflection of light is provided for night viewing, comprising (1) a flexible transparent layer, (2) a smooth-surface, visibly-continuous metallic film presenting a specular reflecting surface facing said transparent layer and to which said transparent layer is adhered, (3) a coating of adhesive on the back side of said smooth-surfaced metallic film, (4) a temporary removable protective liner having a low-adhesion surface next to said adhesive layer, and (5) a discontinuous pattern of reflex-reflecting areas consisting of reflex-reflecting elements firmly affixed in a binder on the front face of said transparent layer, said reflex-reflecting areas covering between about 10 and 30% of the total area of the front face of said sheet material and said sheet material exhibiting a reflex-reflecting return of light for every 36 square inches of area of at least 5 candle power per foot candle of incident light as measured at an angle of one-third degree from the incident beam under nighttime conditions said reflex-reflecting elements consisting essentially of transparent glass bead microspheres having minute specularly-reflecting hemispherical caps underlying the back extremity thereof and having a refractive index of about 1.9.

5. A reflective structure on the front face of which specular reflection of light predominates by normal day viewing and reflex-reflection of light is provided for night viewing, comprising (1) a flexible transparent layer, (2) an adhesive coating on one side of said transparent layer, (3) a smooth-surfaced, visibly-continuous, specular-reflecting metal layer against said adhesive layer, and (4) a discontinuous pattern of reflex-reflecting areas consisting of reflex-reflecting elements firmly affixed in a binder on the front face of said transparent layer, said reflex-reflecting areas covering between about 10 and 30% of the total area of the front face of said transparent layer and said structure exhibiting a reflex-reflecting return of light for every 36 square inches of area of at least 5 candle power per foot candle of incident light as measured at an angle of one-third degree from the incident beam under nighttime conditions, said reflex-reflecting elements consisting essentially of transparent glass bead microspheres having minute specularly-reflecting hemispherical caps underlying the back extremity thereof and having a refractive index of about 1.9.

References Cited in the file of this patent

UNITED STATES PATENTS

| | | |
|---|---|---|
| 1,902,440 | Gill | Mar. 21, 1933 |
| 2,143,946 | Hunter | Jan. 17, 1939 |
| 2,354,048 | Palmquist | July 18, 1944 |
| 2,372,868 | Warren | Apr. 3, 1945 |
| 2,383,884 | Palmquist | Aug. 28, 1945 |
| 2,411,222 | Meigs | Nov. 19, 1946 |
| 2,422,256 | Phillippi | June 17, 1947 |
| 2,555,715 | Tatum | June 5, 1951 |

OTHER REFERENCES

Van Lear article in Journal of the Optical Society of America, vol. 30, October 1940, pages 462–487.